US007024686B2

(12) United States Patent  
Brawn et al.

(10) Patent No.: US 7,024,686 B2
(45) Date of Patent: Apr. 4, 2006

(54) SECURE NETWORK AND METHOD OF ESTABLISHING COMMUNICATION AMONGST NETWORK DEVICES THAT HAVE RESTRICTED NETWORK CONNECTIVITY

(75) Inventors: John Melvin Brawn, San Jose, CA (US); Christian Klein, Herrenberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 694 days.

(21) Appl. No.: 09/854,359

(22) Filed: May 11, 2001

(65) Prior Publication Data

US 2002/0066030 A1  May 30, 2002

Related U.S. Application Data

(60) Provisional application No. 60/204,229, filed on May 15, 2000.

(51) Int. Cl.
  H04K 1/00   (2006.01)
  H04L 9/32   (2006.01)
(52) U.S. Cl. .................................. 726/1; 726/2; 726/3
(58) Field of Classification Search ................ 713/200, 713/201, 202; 709/225, 229; 726/1, 2, 3
  See application file for complete search history.

(56) References Cited

U.S. PATENT DOCUMENTS

| 5,864,666 | A | * | 1/1999 | Shrader ....................... 713/201 |
| 5,884,025 | A | | 3/1999 | Baehr et al. |
| 5,968,176 | A | | 10/1999 | Nessett et al. |
| 6,012,088 | A | | 1/2000 | Li et al. |
| 6,052,788 | A | | 4/2000 | Wesinger, Jr. et al. |
| 6,182,226 | B1 | * | 1/2001 | Reid et al. ..................... 726/15 |
| 6,212,558 | B1 | | 4/2001 | Antur et al. |
| 6,223,209 | B1 | | 4/2001 | Watson |
| 6,243,754 | B1 | | 6/2001 | Guerin et al. |
| 6,304,973 | B1 | | 10/2001 | Williams |
| 6,345,299 | B1 | | 2/2002 | Segal |
| 6,353,886 | B1 | | 3/2002 | Howard et al. |

FOREIGN PATENT DOCUMENTS

| WO | WO98/57465 | 12/1998 |
| WO | WO00/78001 | 12/2000 |

OTHER PUBLICATIONS

Bellovin et al., "Network Firewalls", IEEE, Sep. 1994, pp. 50-57.*

Loshin, Pete, "TCP/IP Clearly Explained", Morgan Kaufman 1999, pp. 38-40.

* cited by examiner

Primary Examiner—Matthew Smithers
Assistant Examiner—Courtney Fields (57) ABSTRACT

A secure network is provided which includes a plurality of anti-bubbles having a plurality of anti-bubble partitions. Each anti-bubble partition has at least one network device configured to transmit and receive data. All the network devices that belong to or correspond to a particular anti-bubble have the same network security policy. Data may not be transmitted between two network devices in the same anti-bubble or two network devices in different anti-bubble partitions of the same anti-bubble. The secure network also includes a plurality of network control points, which has one or more network control point devices having at least one interface. Each anti-bubble partition is connected to at least one network control point. The network control point is used to provide a connection between at least two network devices. Each network control point device is configured to enforce the network security policy of all the anti-bubbles that are connected to it. During the transmission of data from one network device to another network device, one or more network control points are traversed.

52 Claims, 5 Drawing Sheets

SECURE NETWORK AND METHOD OF ESTABLISHING COMMUNICATION AMONGST NETWORK DEVICES THAT HAVE RESTRICTED NETWORK CONNECTIVITY

CROSS-REFERENCE TO RELATED APPLICATION

This application claims priority from U.S. provisional patent application Ser. No. 60/204,229, filed May 15, 2000, which is herein incorporated by reference for all purposes. This application also claims priority from U.S. patent application Ser. No. 09/726,072, filed Nov. 29, 2000, which is herein incorporated by reference for all purposes.

BACKGROUND OF THE INVENTION

1. Field of the Invention

The present invention relates particularly to a secure network configured to provide secure network connections amongst multiple businesses and, more particularly to a secure network and method of establishing communication amongst network devices that have restricted network connectivity.

2. Description of the Related Art

Company networks are vulnerable to numerous network attacks. Network firewalls or similar approaches are deployed as a common business practice to mitigate the risk of such attacks. Typically these security measures allow for unrestricted connectivity within the company or among a known collection of host devices, but they restrict access from public networks and other organizations or unknown devices. For example, the company may allow employees to access any web site on the public Internet, but prohibit access to confidential internal web sites by unknown users from public networks.

Several types of devices have been developed that perform network firewall functions. One commonly known device is a router, which is a device that determines the next network point to which a packet of information is to be delivered. Before the packet is forwarded to another device, the router may use an access list that provides conditions or rules to determine whether the packet has access to the particular destination. In addition, these devices may provide functions such as user authentication. Also, application proxies, e.g., socks and caching web proxies, allow specific applications to be executed for network security and might also employ user authentication.

Companies typically have a network security policy that describes the type of access that should be permitted through firewall devices. This policy is achieved through the application of a combination of the network firewall devices described above. One common network security model implemented by many companies is the concept of dividing the networks into three categories: internal, external, and De-Militarized Zone (DMZ). This type of network security policy is defined by the access permitted between these network categories. That is, the network firewall is made up of devices that provide the interconnections between these network categories. The network firewall is located at a network control point, which is located between the internal network and the external network, e.g., the public Internet, and at any direct links to other companies. End-user hosts and internal servers are part of the internal network. The public Internet and other company networks are part of the external network. Web servers, email servers and other application servers that require general connectivity with the external network are part of the DMZ.

A common network security policy may be that internal systems are permitted to create connections to the external networks, but connections from the external network to the internal network are not permitted, unless they are accompanied by user authentication. In addition, the DMZ hosts are permitted to have connectivity to the external networks and the internal networks independently, but are not permitted to have "pass-through" connectivity from the external networks to the internal networks. An exception to the common network security policy might be configured into the network firewall when, for example, a DMZ or external network may have a particular user or host that must be permitted access to a particular host in the internal network.

The internal, external, and DMZ architecture, however, has many drawbacks. For example, if the company network has multiple external connections to the public Internet that are in different geographic locations, wide-area asymmetric routing to the public Internet is likely. That is, inbound and outbound data for a given connection will not pass through the same firewall device and therefore firewall policies that rely on inspection of the protocol state will fail, because the protocol state will reside in two different firewall devices. In Internet Protocol (IP) networks, technologies such as Network Address Translation (NAT) may be used to work around this problem, but these technologies do not address the underlying issue and often introduce problems in large or complex networks. Currently, no technology is generally available for synchronizing the protocol state between firewall devices in separate geographic locations.

In addition, this architecture is limited to having only one internal network, which exposes the company to great risks if an unauthorized user gains access to the internal network. This architecture also does not allow the company the option of segmenting risk. Hence, a risk taken by one host in the internal network is a risk taken indirectly by all the other hosts in the internal network. This becomes apparent when considering the above exception to the common network security policy. The risk to all the internal hosts is greatly increased for every host in the external network that is permitted access to the internal network via the network firewall or DMZ.

This architecture is further limited due to its difficulty in maintaining a uniform firewall policy for firewall devices that are across geographic locations and company units. Each firewall device has a combination of a number of diverse and complex rules that reflect the overall security policy and the specific exception cases required at that specific network control point. Each of these network control points represents a risk to the entire company. If there is a simple misconfiguration on any firewall device, the entire internal network is exposed to an unintended security breach or unwanted behavior. As the number of network control points increase, the likelihood of security exposure increases dramatically.

Another network security architecture includes establishing concentric rings of network access control. This architecture allows the most sensitive information resources to be kept in the innermost rings, while the most common information resources to be kept in the outermost rings. External networks are outside of the outermost ring. The network security policy for the outer rings is fairly permissive, while the network security policy for the inner rings is much more restrictive.

One limitation of the concentric ring architecture is that some connections are required to traverse multiple firewalls for communication between two hosts at different levels. For example, if there are four firewall rings, then the external hosts have to traverse four firewalls before gaining access to the inner host in the innermost ring. For each additional firewall traversed, the time required to access the inner host is increased.

Another limitation is that the network security policy for the inner rings is limited by the policy enforced for the outer rings. Therefore, it is not possible for the inner ring to permit connectivity from external networks that is disallowed by an outer ring. For example, it is impossible for an inner ring to allow the incoming telnet access, unless that access is also granted at each of the outer rings of security.

These limitations described above for the various network security architectures apply to networks of any size, but become more severe when considering large or highly distributed networks. A Network Service Provider (NSP), Internet Service Provider (ISP), Application Service Provider (ASP), E-Service Provider (ESP), or a large enterprise may have over 100 network control points around the world where a network security policy must be administered. Using the network architectures described above, it is almost impossible to ensure that the policies are consistent and error-free at each of the network control points.

Another drawback for large enterprises or service providers with firewalls at the network control points is that the network security policy governing any given hosts must be configured consistently at all the O(n) firewalls, where n is the number of network control points for the enterprise. This creates a lot of redundant work and greatly increases the likelihood of error in configuration. Also, this can lead to a lack of direct accountability for the network security policy. To determine the network security policy for any given host, the network security policy must be examined at every network control point across the enterprise. The network security policy implemented at network control points that are topologically distant from the host have an equal role in determining the enterprise network security policy for that host.

Now suppose, an enterprise desires to establish network connections with multiple business partners. In this situation, the multiple business partners connected to the same enterprise must be assured that no two business partners have any unexpected connection resulting in one business partner having access to the other business partner's confidential information. For example, a virtual private network infrastructure supporting connectivity from various business partners may result in unexpected connections. One way to avoid this is to treat each business partner as a separate bubble with separate network boundary equipment. One drawback of using separate network boundary equipment is that it is expensive to dedicate interfaces and network devices to individual business partner connections.

Therefore, it should be appreciated that there is a need for systems and methods that overcome the above drawbacks and limitations. The present invention fulfills this need as well as others.

SUMMARY OF THE INVENTION

A secure network is provided which includes a plurality of anti-bubbles having a plurality of anti-bubble partitions. Each anti-bubble partition has at least one network device configured to transmit and receive data. All the network devices that belong to or correspond to a particular anti-bubble have the same network security policy. Data may not be transmitted between two network devices in the same anti-bubble or two network devices in different anti-bubble partitions of the same anti-bubble. The secure network also includes a plurality of network control points, which has one or more network control point devices having at least one interface. Each anti-bubble partition is connected to at least one network control point. The network control point is used to provide a connection between at least two network devices. Each network control point device is configured to enforce the network security policy of all the anti-bubbles that are connected to it. During the transmission of data from one network device to another network device, one or more network control points are traversed.

BRIEF DESCRIPTION OF THE DRAWINGS

Embodiments of the present invention will now be described, by way of example only, with reference to the following drawings in which.

DESCRIPTION OF THE PREFERRED EMBODIMENT

In this description, the present invention is described in detail with regard to the drawing figures briefly described below. Similar labels and numbers on one drawing figure may represent the same element on other drawing figures. As such, the following terms are used throughout this description. For purposes of construction, such terms shall have the following meanings:

The term "anti-bubble," unless otherwise specified, is intended to refer to two or more devices that have no network access or connectivity with each other. Each anti-bubble is made up of at least one anti-bubble partition.

The term "anti-bubble partition," unless otherwise specified, is intended to refer to a number of devices within an anti-bubble, where each device connects to at least one network control point.

The term "anti-bubble member," unless otherwise specified, is intended to refer to all devices with one or more network interfaces within an anti-bubble that has no network connectivity with any other device within the same anti-bubble.

The terms "anti-bubble boundary," "anti-bubble boundary device," and "bubble boundary device," unless otherwise specified, is intended to refer to one or more devices in a network control point that connects to one or more anti-bubble partitions or bubble partitions and enforces the network security policy for the anti-bubbles and bubbles.

The term "bubble," unless otherwise specified, is intended to refer to two or more devices that have unrestricted network access with each other and share a common network access policy. Each bubble is made up of at least one bubble partition.

The term "bubble partition," unless otherwise specified, is intended to refer to a network of devices within a bubble, including bubble boundary devices, that connect to at least one network control point.

The term "bubble member," unless otherwise specified, is intended to refer to one or more devices with one or more network interfaces within a bubble, that has unrestricted network connectivity to all other devices within the same bubble.

The terms "network access policy" and "network security policy," unless otherwise specified, are intended to refer to one or more rules or criteria that govern the movement of data across an anti-bubble boundary.

The term "network control point," unless otherwise specified, is intended to refer to a physically co-located collection of one or more devices that perform one or more of the following functions: interconnect anti-bubble partitions, interconnect bubble partitions, interconnect network control point devices, interconnect network control points, and/or enforce a network security policy.

The term "virtual backbone," unless otherwise specified, is intended to refer to a network that connects a plurality of network control points having the property of source integrity (e.g., anti-spoofing). The virtual backbone is external to all of the anti-bubbles and network control points.

The term "unknown bubble," unless otherwise specified, is intended to refer to all networks and devices that are not part of any known bubble. In an IP network, the unknown bubble includes the hosts and networks in the public Internet or private networks that are not part of known bubbles. In as much as they are unknown, no assumptions can be made with regard to connectivity between devices in the unknown bubble, nor can source integrity be assumed. There may be multiple unknown bubbles, each with one or more bubble partitions. Each unknown bubble partition can connect to multiple network control points (NCPs).

The term "known anti-bubble," unless otherwise specified, is intended to refer to all anti-bubbles with known network security policies and source integrity.

The term "inter-bubble device," unless otherwise specified, is intended to refer to one or more devices with one or more network interfaces that are simultaneously a member of more than one anti-bubble or bubble, but is not part of a network control point. An inter-bubble device must enforce the network security policy for each of the anti-bubbles and bubbles of which they are members.

The term "network device," unless otherwise specified, is intended to refer to a device connected to a network. The device can be, e.g., a host, client, server, workstation, desktop, laptop, printer, router, and switch.

Figure 1:
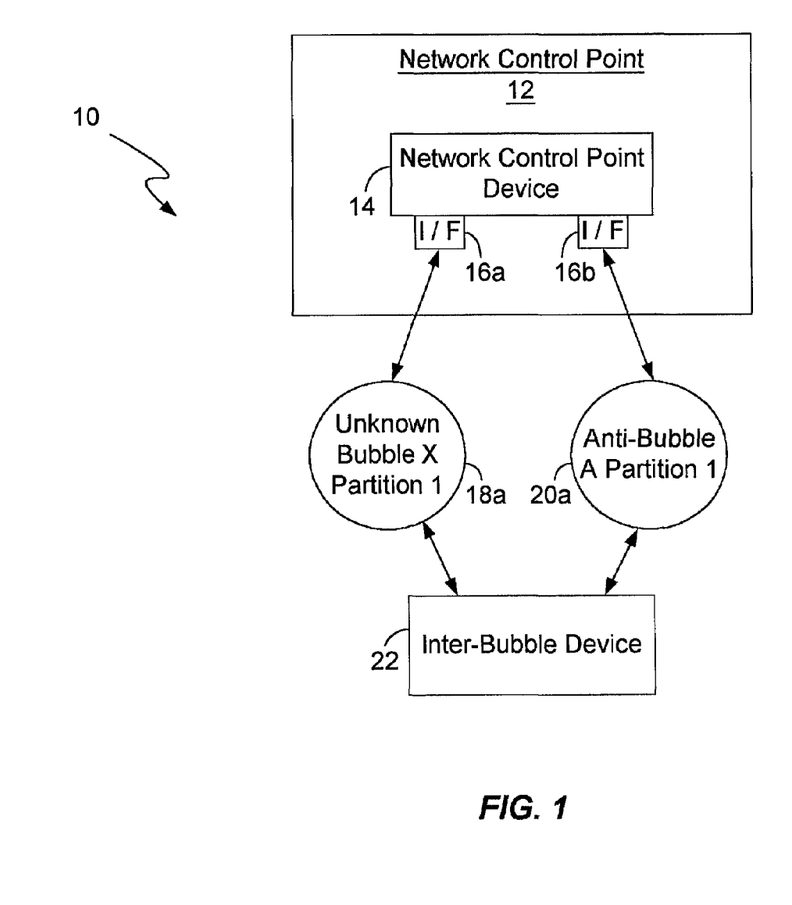
FIG. 1 is a simplified block diagram of a secure network.

With reference now to the illustrative drawings, and particularly to FIG. 1, there is shown a simplified block diagram of a secure network 10. The secure network might include a network control point 12, a network control point device 14, interfaces 16, an unknown bubble X, which includes a bubble partition 18a, a known anti-bubble A, which includes an anti-bubble partition 20a, and an inter-bubble device 22.

The network control point 12 includes one or more network control point devices 14. Each network control point device might include one or more interfaces 16a, 16b, which are used to connect the network control point device to bubble 18 and anti-bubble 20. By way of example, in the case of an Internet protocol (IP) network, the interface may be a router port, or a local area network (LAN) adapter on a host. In the case of a wireless network, the interface can represent a wireless access point connected to a device that routes data.

Network control point devices 14 are used to route data and/or enforce a network security policy. For example, data can be routed from unknown bubble partition 18a to anti-bubble partition 20a, and vice versa, using the network control point devices. By way of example, this could be done in an IP network using a routing device capable of determining from the destination IP address that the data received on interface 16a should be sent to anti-bubble partition 20a through interface 16b. In addition, the network control point devices can enforce the network security policy of the particular network control point 12. By way of example, in an IP network, routing devices can be used to enforce rules based on the contents of the data. Further, a wide variety of other devices can perform this function with differing levels of sophistication. In an IP network, one network policy decision that can be made by the network control point 12 involves allowing or restricting access based on the source IP address. More advanced devices can allow or restrict access by applying rules based on various protocols or an analysis of the context of a connection. The later capability is generally called stateful inspection. When a network control point device serves to enforce a particular network security policy, the network control point device might also be referred to as an anti-bubble boundary device.

The anti-bubble boundary device ensures that all data received from an anti-bubble is en-route to a network address that belongs to a different anti-bubble or bubble. This is generally referred to as a form of reverse anti-spoofing. The anti-bubble boundary restricts data from travelling from one anti-bubble partition to another anti-bubble partition of the same anti-bubble. For example, a network device in one anti-bubble partition is restricted from communicating with a network device in another anti-bubble partition of the same anti-bubble. When the anti-bubble boundary implements user authentication and authorization, the anti-bubble boundary is configured to ensure integrity of the source address after the authorization rules have been applied.

The bubble boundary device allows data to travel from one bubble partition to another bubble partition of the same bubble. For example, a network device in one bubble partition is allowed to communicating with a network device in another bubble partition of the same bubble. When the bubble boundary implements user authentication and authorization, the bubble boundary is configured to ensure integrity of the source address after the authorization rules have been applied. The anti-bubble boundary device and the bubble boundary device may be the same device.

Each bubble can be an unknown bubble 18a, a known bubble (not shown), or a known anti-bubble 20a. The unknown bubble might represent the public Internet or a private network about which no security assumptions can be made. A device in the unknown bubble cannot access other devices that are located in the same unknown bubble. Also, a device in the unknown bubble might or might not be able to access data from a device in a known bubble or known anti-bubble. Whether a device in an unknown bubble can access data from another device in a known bubble or known anti-bubble depends on the network security policy of the known bubble and known anti-bubble as enforced by a network control point device (i.e., anti-bubble boundary).

The inter-bubble device 22 connects two or more anti-bubbles and bubbles to one another. The inter-bubble device is typically used in a situation where it is desirable to move data between anti-bubble or bubble, or access resources from more than one anti-bubble or bubble, or provide resources to more than one anti-bubble or bubble without going through a network control point. The inter-bubble device differs from the network control point in that it principally exists to expedite the movement of data for select purposes. Hence, inter-bubble devices must include capabilities to enforce network security policies. The inter-bubble device provides a local connection between one or more bubble partitions 18a and anti-bubble partitions 20a so that data can be processed with reduced network latency resulting in increased throughput. The inter-bubble device and the network control point device 14 implement the same network security policy with regards to bubble partition 18a and anti-bubble partition 20a.

Figure 2:
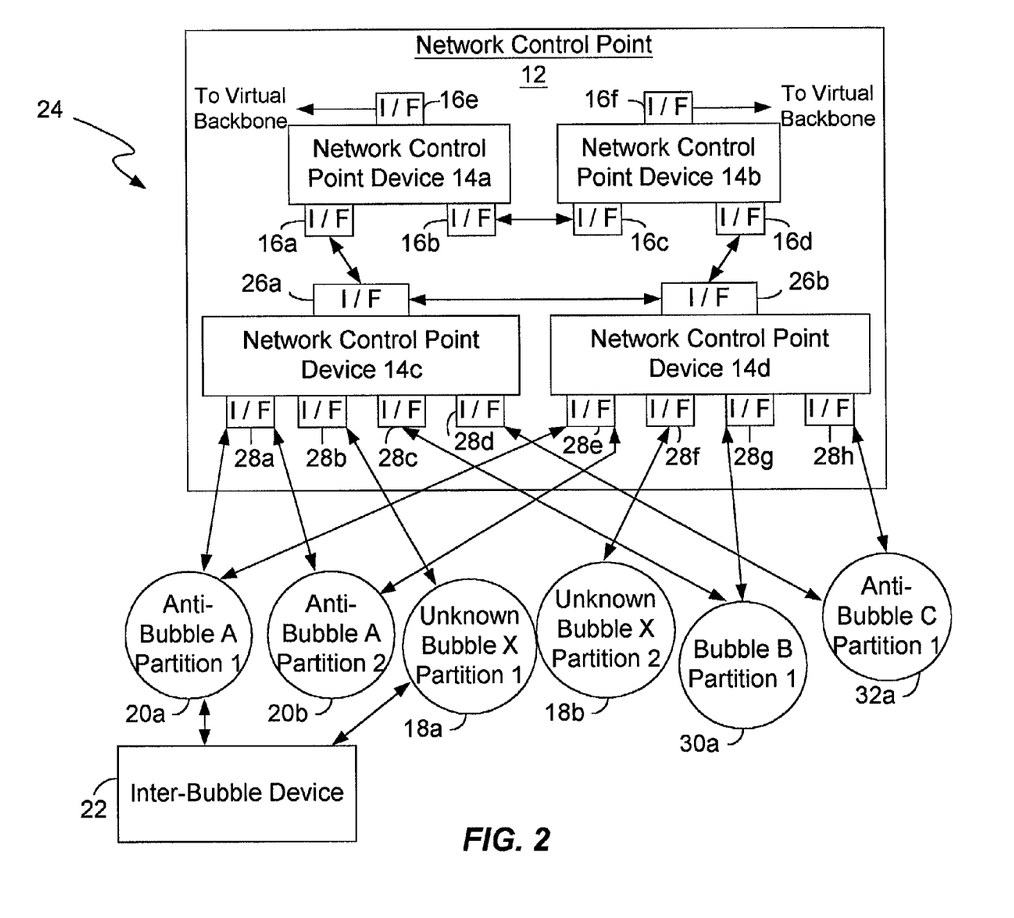
FIG. 2 is a simplified block diagram of a secure network that is more complex than the block diagram of the secure network of FIG. 1.

FIG. 2 is a simplified block diagram of a secure network 24, which includes a network control point 12 and a number of anti-bubbles A, C and bubbles X, B. Each anti-bubble and bubble includes one or more anti-bubble partitions and bubble partitions, respectively. For example, anti-bubble A includes anti-bubble partition 20a and anti-bubble partition 20b. In the case of an IP network, anti-bubble partitions and bubble partitions are defined by address ranges corresponding to one or more devices. In IP networks, address ranges are defined by a base address and a mask applied to the address to determine if an address is included in the range. Alternatively, anti-bubble partitions and bubble partitions may be defined by the placement of a network access point, which allows the secure network to be used with wireless networks. Other factors can be applied to distinguish anti-bubbles and bubbles based on the underlying network technology used.

In the case of an IP network, any host or network device having a network address within the address ranges for a given anti-bubble partition is described as being a member of that anti-bubble. Members of an anti-bubble have no network connectivity to any other members of the same anti-bubble. Moreover, members of any anti-bubble partition have no network connectivity to members of any other anti-bubble partition within the same anti-bubble. For example, a host in anti-bubble partition 20a does not have network connectivity to any host in anti-bubble partition 20a or anti-bubble partition 20b. Bubble partitions 18a, 18b are partitions of unknown bubbles that represent the public Internet or a private network. Hosts within an unknown bubble partition do not have network connectivity to other hosts within the same unknown bubble but might have network connectivity to hosts within a different unknown bubble.

Using FIG. 2 as an example, the network control point 12 includes a number of network control point devices 14a, 14b, 14c, 14d, each having a plurality of network interfaces. Network control point device 14a is connected to network control point device 14b via interfaces 16b, 16c and is connected to network control point device 14c via interfaces 16a, 26a. Similarly, network control point device 14d is connected to network control point device 14b via interfaces 16d, 26b and is connected to network control point device 14c via interfaces 26a, 26b. Network control point devices 14a, 14b route the data from one anti-bubble partition or bubble partition to another, and provide source integrity and security. For example, network control point devices 14a, 14b are devices that receive data from and route data to other network control points. In addition, network control point devices 14a, 14b receive data from and route data to other network control point devices 14c, 14d and other network control points via interface 16e and 16f. Network control point devices 14c, 14d are anti-bubble boundary devices that provide source integrity and enforcement of network security policies. Each network control point device may have interfaces in multiple anti-bubble partitions and bubble partitions. Therefore, a network control point device may be a member of multiple anti-bubble partitions and bubble partitions. For example, network control point device 14c is a member of anti-bubble partitions A-1, A-2, and C-1 and bubble partitions X-1, and B-1.

Depending on the type of networks, routing, and security policy requirements, the network control point devices 14a, 14b, 14c, 14d may be routers with access lists, a dedicated network firewall device, an application proxy or relay, a network gateway, or any appropriate device capable of enforcing source integrity, network security policy, and routing functions. A combination of devices performing these functions may also be used to achieve the desired functionality.

Each anti-bubble partition 20a might include a number of anti-bubble members that transmit data to and receive data from anti-bubble members of anti-bubble partitions that belong to different anti-bubbles. All the members of a particular anti-bubble partition 20a may not access data from other members in the same anti-bubble partition 20a. For example, anti-bubble partition 20a may include bubble member Y and bubble member Z, and bubble member Y cannot access data from bubble member Z.

Anti-bubble partitions 20a, 20b of the same anti-bubble 20 may share a common interface 28a of the network control point device 14c. Anti-bubble partitions can also be connected to multiple network control point devices within the same network control point 12. FIG. 2 demonstrates, for the case of an IP network, that in the event of a network device failure or to achieve requirements for network utilization (e.g., load balancing, packet shaping, guaranteed performance), data can be routed between multiple devices within the same network control point to allow unrestricted network access between devices in multiple anti-bubble partitions of different anti-bubbles.

However, before a device in one anti-bubble partition 20a can have access to data from a device in another anti-bubble partition 32a of a different anti-bubble, the network control point device 14c or 14d must apply the network security policy of both of the anti-bubble partitions 20a and 32a. Therefore, since each different anti-bubble 20 and 32 has a distinct network security policy, a device contained in one anti-bubble partition 20a must satisfy the network security policy established by both of the anti-bubble partitions 20a and 32a before gaining access to the device and data contained in the anti-bubble partition 32a. That is, anti-bubbles and anti-bubble partitions have network security policies that can apply to both inbound and outbound data. In addition, all the anti-bubble members from a particular anti-bubble partition 20a may access data from another anti-bubble partition 32a that belongs to a different anti-bubble by satisfying the network security policy established by anti-bubble partitions 20a and 32a, which might be the same. In the case of an anti-bubble 20 with two anti-bubble partitions 20a and 20b, a network device that is a member of anti-bubble partition 20a will have no network access to a device in anti-bubble partition 20b because network control point device 14c or 14d will restrict network access amongst all members of the same bubble 20 regardless of partitioning.

Similarly, before a device in one anti-bubble partition 20a can have access to data from a device in one bubble partition 30a, the network control point device 14c or 14d must apply the network security policy of both of the anti-bubble partitions 20a and the bubble partition 30a. Therefore, since the anti-bubble 20 and the bubble 30 have distinct network security policies, a device contained in one anti-bubble partition 20a must satisfy the network security policy established by both of the anti-bubble partitions 20a and the bubble partition 30a before gaining access to the device and data contained in the bubble partition 30a. That is, anti-bubbles and bubbles have network security policies that can apply to both inbound and outbound data. In addition, all the anti-bubble members from a particular anti-bubble partition 20a may access data from bubble members of a bubble partition 30a by satisfying the network security policy established by anti-bubble partition 20a and bubble partition 30a, which might be the same.

Network traffic originating from a device located in anti-bubble partition 20a will be subject to source integrity and security policy checks by device 14c or 14d before being routed to a device located in bubble partition 30a or anti-bubble partition 32a. The data will be routed to the destination device in bubble partition 30a or anti-bubble partition 32a provided that security policy for bubble partition 30a or anti-bubble partition 32a enforced by network control point device 14c or 14d permits this type of traffic and source integrity is not violated. In addition, one anti-bubble partition does not automatically inherit the network security policy of another anti-bubble partition. That is, even though network control point device 14c and 14d both enforce network security policy for anti-bubble partitions 20a and 32a, anti-bubble partition 20a does not inherit the network security policy of anti-bubble partition 32a.

The network control point devices 14a, 14b, 14c, 14d enforce source integrity for the anti-bubble partition and bubble partition that they are connected to. In an IP network, for example, source integrity is commonly referred to as anti-spoofing and means that a router will block data marked as originating from an address that is not part of the valid address range for a particular interface. Other methods for validating source integrity apply to other types of networks. By way of example, for lower level networks, a media access control (MAC) address can be checked for validity against a list of known addresses. It is important for all network control point devices to strictly enforce source address integrity. Per source integrity practice for IP networks, a member of an anti-bubble is not permitted to send data outside the anti-bubble partition if it is not sourced from an address within the range that defines its anti-bubble partition. The concept of source integrity is known in the art and these examples are not intended to be exhaustive.

All anti-bubble partitions of a single anti-bubble implement a common network security policy. An example of network security policy in an IP network is when a particular anti-bubble boundary does not allow any user datagram protocol (UDP) traffic originating outside the anti-bubble to come into the anti-bubble, and that transmission control protocol (TCP) connections must only originate from within the anti-bubble with no additional restrictions on application protocols. Such rules might be appropriate when all hosts within the anti-bubble include sufficient security measures to protect them from exploit launched through an allowed method of network communication. In this instance, antiviral software offering real-time protection against hostile content arriving over e-mail or the Web might be appropriate. Hence, anti-bubble security is provided by a combination of network and host security measures. Host security is a combination of physical control, access restrictions, configuration management, operational processes, intrusion detection and response, and software version control. This example is only to illustrate the nature of network security policy. Depending on the security need, the sophistication of firewall technology available, and the type of network used, rules can be highly tailored to meet particular needs.

The network control point 12 is made up of network control point devices, e.g., 14c, that have at least two interfaces (I/F), e.g., 28a, 28b. Interface 28a may connect to one or more anti-bubble partitions, e.g., 20a and 20b. An interface typically does not allow connection of two or more anti-bubble partitions without requiring the enforcement of network security policy at a network control point device 14. Also, the interfaces (e.g., 16a and 26a) might be part of the network control point devices that are used to interconnect network control point devices. The network control point may include multiple network control point devices for redundancy and for separating the tasks provided by each anti-bubble boundary. These network control point devices may implement the same network security policy. Where ability to connect or addressing is used to determine anti-bubble membership, anti-bubble partitions belonging to different anti-bubbles may share the same network interface on network security policy devices. In an IP network, for example, two devices sharing the same LAN interface would, by definition of the underlying technology, be able to connect with each other and hence must share the same network security policy.

No topological hierarchy exists for the anti-bubble partitions. In addition, one anti-bubble, e.g., anti-bubble A, may not be directly connected to another anti-bubble, e.g., anti-bubble C. Rather, data traveling between different anti-bubbles must traverse at least one network control point device 14c or inter-bubble device 22. Similarly, two anti-bubble partitions of the same anti-bubble may not be connected directly to one another and must be connected to one or more network control point devices within the same network control point. The network control point interconnects anti-bubble partitions, network control point devices within the same network control point, and the network control point to other network control points. The network control point 12 also includes network control point devices 14a and 14b that connect through interfaces 16e, 16f to the virtual backbone.

Firewall policy synchronization is only required for the network control point devices that are implementing a common network security policy, rather than all the network control point devices across the entire company. Network security policy for any given host within an anti-bubble partition is managed at O(1) firewalls, rather than O(n) firewall, where n is the number of external control points for the company. A common network security policy can exist in multiple geographic locations.

Figure 3:
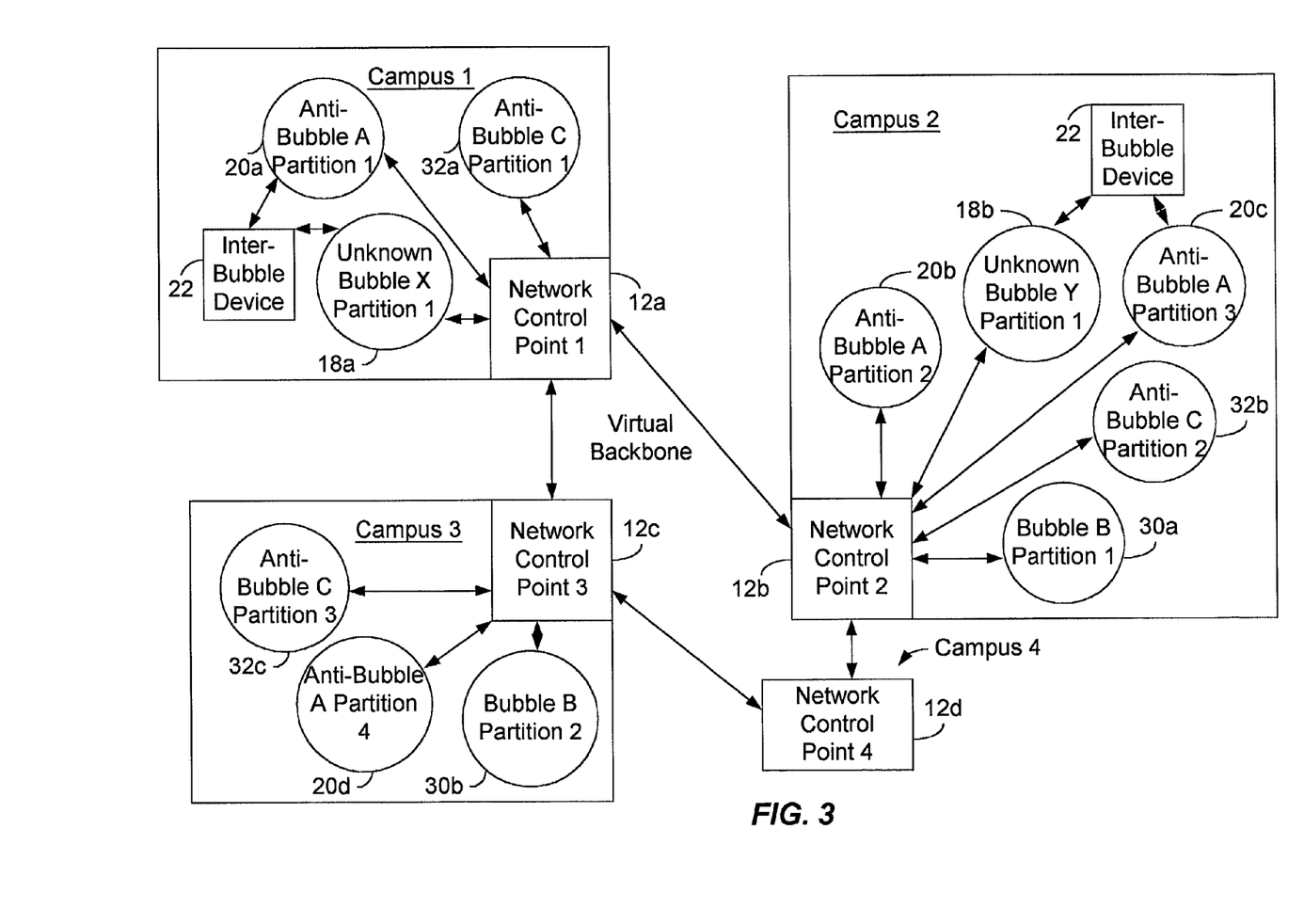
FIG. 3 is a simplified block diagram illustrating four different real or virtual locations utilizing the secure networks of FIGS. 1 and 2.

FIG. 3 is a simplified block diagram illustrating four different real or virtual locations utilizing the network security system of FIGS. 1 and 2. Campus 1, 2, 3, and 4 can be organized as four separate real or virtual locations or one location having four separate regions. The bubble configuration and connections for that network control point need not be known to permit interoperation with bubbles implemented at campuses 12a, 12b, and 12c. Network control point 4 (12d) may be implemented by another entity at any location.

Each campus is connected to one another via the network control point 12. More specifically, the network control point devices 14 of the network control point are coupled to one another. The network created by the interconnection of network control points forms a virtual backbone. The virtual backbone is a special network bubble type. It is the collection of all network control points 12 for an enterprise or entity implementing a network utilizing the principles of this invention along with the links connecting the network control points to each other. Typically an enterprise will have one virtual backbone, and service providers may have one or more depending upon the needs of their customers and the networking requirements imposed by their customer's needs. The number of virtual backbones is a function of implementation of the invention and has no bearing on the operation of the resulting network.

Regarding the virtual backbone, the source address of all anti-bubble partitions and bubble partitions must be strictly enforced at the network control points and integrity of the source address must be maintained in all virtual backbone links, which interconnect network control points. The minimum network security policy for the virtual backbone is that it will enforce source address integrity on its external connections, that is, not allowing external networks to send data that masquerade as being sourced from address space included in a known bubble or anti-bubble implemented, or reserved for implementation.

Except in the case of a service provider that explicitly wishes to permit transit traffic, the virtual backbone will also enforce strict restrictions on transit data traffic, so that external networks will not make unauthorized use of the enterprise virtual backbone links. Although all other network bubble traffic for the enterprise will traverse the virtual backbone, it will remain a separate bubble unto itself. The virtual backbone is outside the bubble boundary or firewall and is external to all of the plurality of network anti-bubbles and bubbles. The anti-bubble partitions and bubble partitions themselves are not part of the virtual backbone, so they must utilize separate real or virtual equipment for LAN and WAN infrastructure that is contained entirely within a bubble boundary. This allows for a consistent network security policy for each anti-bubble partition and bubble partition that may be managed and maintained independent of the virtual backbone that is used to interconnect network control points.

FIG. 3 demonstrates that relatively complex networks can be constructed across separate locations each implementing a consistent network security policy. Each anti-bubble and bubble may be controlled or owned by a different part of an enterprise. Anti-bubble A includes anti-bubble partitions 20*a*, 20*b*, 20*c* and 20*d* implemented at 3 locations, e.g., campus 1, 2 and 3. Network security policy for anti-bubble partition 20*d* will be enforced at network control point 12*c*, while enforcement for anti-bubble partition 20*a* will be carried out at network control point 12*a*. Network control points 12*a*, 12*b*, and 12*c* will enforce consistent network security policy for all partitions of anti-bubble A. The same will be true of all partitions of all anti-bubbles connected to every network control point within the virtual backbone.

The network security policy is enforced at each network control point 12. Enforcement at topologically "local" network control points eliminates wide area routing asymmetry issues and its restrictions on the use of stateful packet inspection firewalls. Asymmetric routing occurs when data between two points traverse different interfaces for any given round-trip exchange. By requiring all data for a particular anti-bubble to traverse a single anti-bubble boundary implemented by one or more network control point devices 14 located at a single network control point 12, the anti-bubble boundary becomes a concentration point for all traffic hence providing a single point for enforcing network security policy regardless of asymmetry outside of the network control point. FIGS. 1, 2, and 3 demonstrate this embodiment of the secure network.

Figure 4:
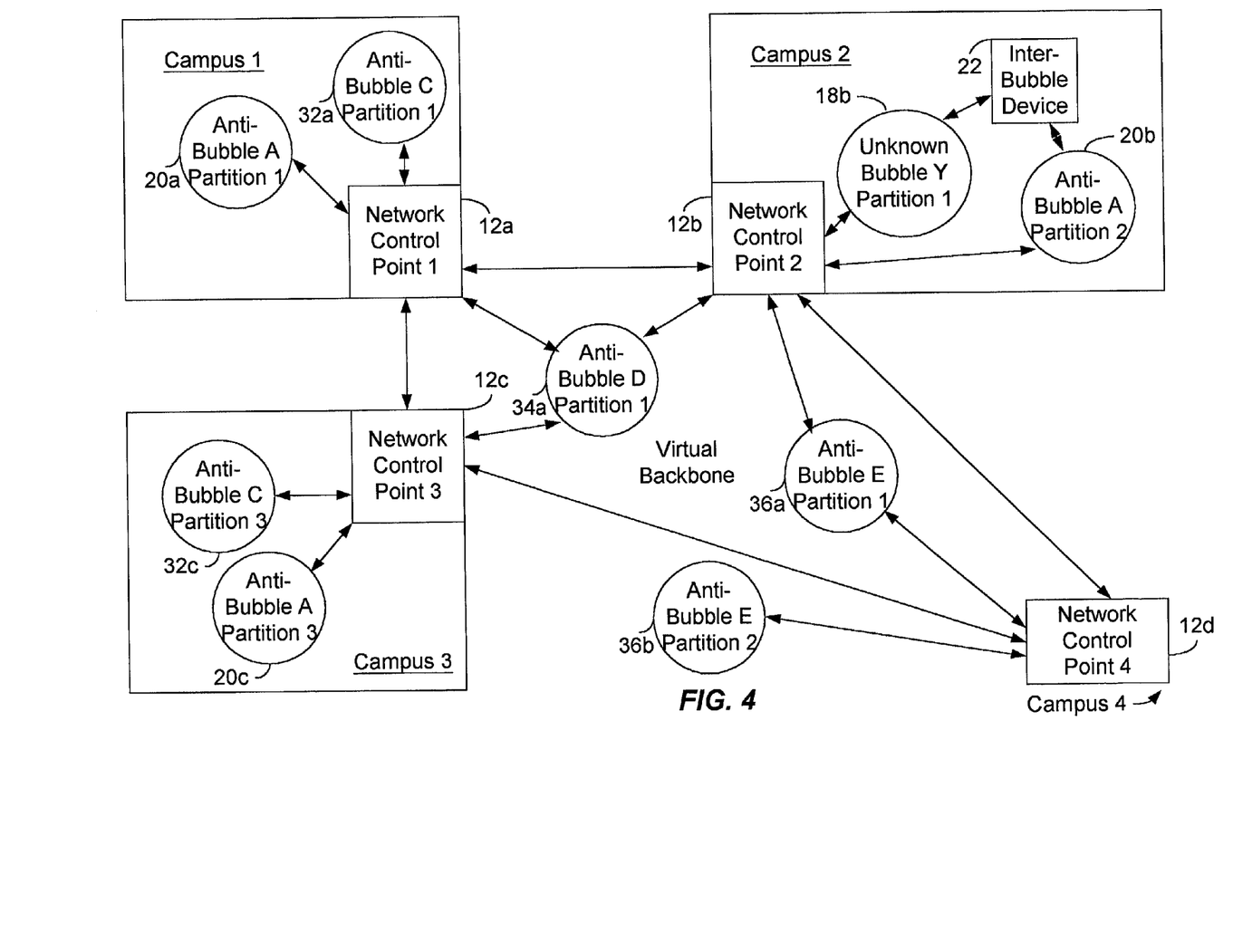
FIG. 4 is a simplified block diagram illustrating two anti-bubble partitions distributed across four different real or virtual locations utilizing another embodiment of the secure network of FIGS. 1 and 2.

FIG. 4 is a simplified block diagram illustrating two anti-bubble partitions distributed across four different real or virtual locations utilizing another embodiment of the secure network of FIGS. 1 and 2. The secure network of FIG. 4 may be appropriate where asymmetric routing is not a consideration. The secure network of FIG. 4 includes anti-bubble D having one anti-bubble partition 34*a* and anti-bubble E having two anti-bubble partitions 36*a* and 36*b*. Anti-bubble partition 34*a* is connected to three network control points 12*a*, 12*b*, and 12*c*. Hence, all three network control points are topologically "local." Therefore, network devices in anti-bubble partition 34*a* are subject to asymmetric routing. Anti-bubble partition 36*a* is connected to two network control points 12*b* and 12*d*. Similarly, network devices in anti-bubble partition 36*a* are subject to asymmetric routing points to which an anti-bubble partition is directly connected must enforce the network security policy for the anti-bubble. Hence, the network security policy for all anti-bubble partitions connected to multiple network control points is limited to those capabilities that can be controlled across multiple locations.

The network security policy for the network devices in each anti-bubble partition is enforced identically at each of the multiple (m) network control points, where m is the number of network control points connected to a particular anti-bubble partition. That is, if an anti-bubble partition is connected to 10 different network control points, then m is equal to 10. The value of m is less than n, where n is the total number of network control points in the secure network. In this embodiment of the secure network, m is preferably at least one order of magnitude of 10 less than n. That is, if n is 100, then m is preferably less than 10, more preferably less than 5, and most preferably 1 or 2. These are only a few examples of the values of n and m. That is, the secure network can utilize a variety of values for n and m while still maintaining the spirit and scope of the present invention.

Figure 5:
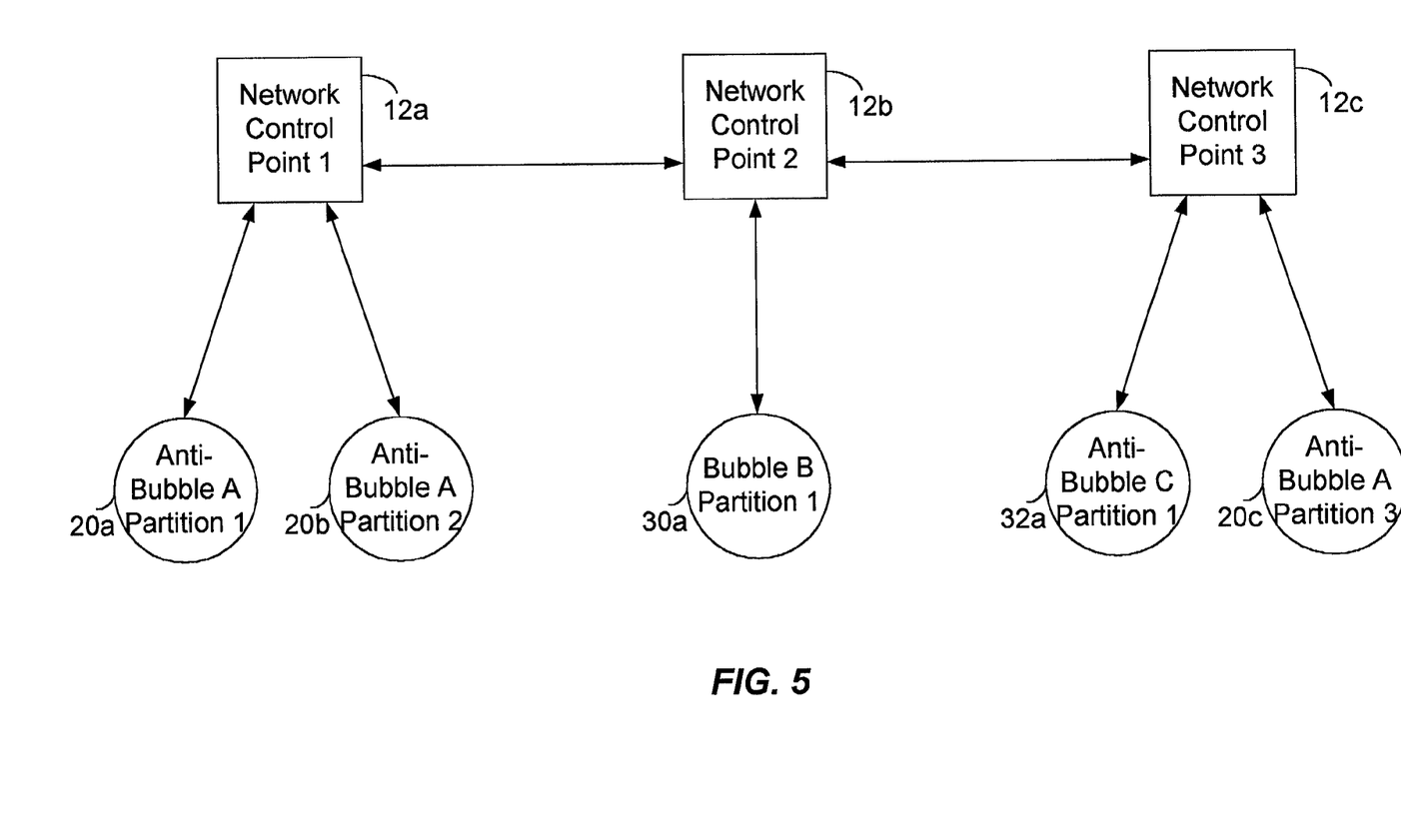
FIG. 5 is a simplified block diagram illustrating three different real or virtual locations utilizing another embodiment of the secure network of FIGS. 1 and 2.

FIG. 5 is a simplified block diagram illustrating three different real or virtual locations utilizing another embodiment of the secure network of FIGS. 1 and 2. The secure network of FIG. 5 illustrates a case where a network topology includes network control points 12*a*, 12*b* and 12*c* that act solely to route data as part of a virtual backbone. In this simplified block diagram of an embodiment of the secure network described in FIGS. 1 and 2, anti-bubble A has three anti-bubble partitions 20*a*, 20*b*, and 20*c*. Two of the anti-bubble partitions 20*a* and 20*b* are connected to a single network control point 12*a*. The third anti-bubble partition 20*c* is connected to a single network control point 12*c*. Bubble B has one bubble partition 30*a* connected to a single network control point 12*b*. Anti-bubble C has one anti-bubble partition 32*a* connected to a single network control point 12*c*. There is a network connection between network control points 12*a* and 12*b*, and another network connection between network control points 12*b* and 12*c*. However, no network connection exists between control points 12*a* and 12*c*.

As in most of the embodiments of the secure network, except in the presence of an inter-bubble device, all data sent from or received by a network device in an anti-bubble partition or bubble partition and destined for or received from a network device in another anti-bubble partition or bubble partition must traverse a network control point device as part of a network control point. Hence, data sent from anti-bubble partition 20*a* must traverse network control point 12*a* before it can be received at any other anti-bubble or bubble partitions within the secure network. This principle can be similarly applied to all anti-bubble partitions and bubble partitions within the secure network.

In this example, data cannot be sent or received between two partitions of the same anti-bubble A 20a and 20c. However, data may be sent from anti-bubble partition 20a to anti-bubble partition 32a, but must traverse network control point 12b since there is no direct connection between control points 12a and 12c. In this case, network control point 12b does not apply the network security policy of either anti-bubble partition between which data is being transmitted. Rather, the devices of the network control point 12b perform a routing function and enforce the requirements of the virtual backbone (e.g. source integrity). This would be true of data transmitted between any anti-bubble partitions connected to network control point 12a when sent or received from any anti-bubble partition connected to network control point 12c. Network control point 12b enforces network security policy only when data is being transmitted to or from network devices in bubble partition 30a. A network control point, e.g., 12b, that performs a routing function and/or enforces the requirements of the virtual backbone is referred to as an intermediate network control point.

The foregoing detailed description of the present invention is provided for the purposes of illustration and is not intended to be exhaustive or to limit the invention to the precise embodiment disclosed. Several embodiments of the secure network have been described that are provided for the purposes of illustration and are not intended to be exhaustive or to limit the invention to the precise embodiment disclosed. The embodiments may provide different capabilities and benefits depending on the configuration used to implement the secure network. Accordingly, the scope of the present invention is defined by the following claims.

What is claimed is:

1. A secure network configured to carry data, comprising:
   a plurality of anti-bubbles, each anti-bubble having a plurality of anti-bubble partitions, each anti-bubble partition having at least one network device configured to transmit and receive data and each anti-bubble partition having no network connectivity to all other anti-bubble partitions within the same anti-bubble, and all of the network devices corresponding to at least one of the plurality of anti-bubbles have the same network security policy; and
   a plurality of network control points, each network control point including one or more network control point devices having at least one interface, wherein each of the plurality of anti-bubble partitions is connected to at least one network control point to form an anti-bubble boundary, the network control point is used to provide a connection between any two network devices, and wherein at least one of the network control point devices is configured to enforce the network security policy of the anti-bubble that is connected to the network control point device.

2. A secure network as defined in claim 1, further comprising a plurality of inter-bubble devices, each inter-bubble device is configured to connect at least two of the plurality of anti-bubbles to one another and to enforce the network security policy of each of the plurality of anti-bubbles that the inter-bubble device is connected to.

3. A secure network as defined in claim 1, wherein each of the plurality of anti-bubble partitions that belong to the same anti-bubble has the same network security policy applied at each of the plurality of network control points that are connected to the plurality of anti-bubble partitions.

4. A secure network as defined in claim 1, wherein each of the plurality of anti-bubble partitions is defined by an address range.

5. A secure network as defined in claim 4, wherein each of the network devices in each of the plurality of anti-bubble partitions has an address contained within the address range.

6. A secure network as defined in claim 5, wherein each address exists in only one of the plurality of anti-bubble partitions.

7. A secure network as defined in claim 1, wherein each of the plurality of network control points ensures source address integrity at each anti-bubble boundary.

8. A secure network as defined in claim 1, wherein each of the plurality of anti-bubble partitions is connected to at least two network control point devices to achieve high availability in the case of a failed interface or network control point device.

9. A secure network as defined in claim 1, wherein data may not be transmitted between two network devices in different anti-bubble partitions of the same anti-bubble.

10. A secure network as defined in claim 1, wherein the plurality of network control points are coupled to one another and form a virtual backbone that is external to all of the plurality of anti-bubbles.

11. A secure network as defined in claim 10, wherein each of the plurality of network control points ensure source address integrity across the virtual backbone.

12. A secure network as defined in claim 1, wherein each network device connects to only one network control point.

13. A secure network as defined in claim 1, wherein the total number of network control points is greater than the number of network control points connected to any one particular anti-bubble partition.

14. A secure network as defined in claim 1, wherein all data transmitted from one network device to another network device traverses only one network control point.

15. A secure network as defined in claim 1, wherein all data transmitted from one network device to another network device traverses only two network control points.

16. A secure network configured to transmit data, comprising:
    a first and a second anti-bubble, each anti-bubble having a distinct network security policy and a plurality of anti-bubble partitions, each anti-bubble partition having a plurality of network devices configured to transmit and receive data; and
    a plurality of network control points, each network control point having one or more network control point devices, each network control point device having at least one interface, wherein each anti-bubble partition is connected to at least one and no more than two network control points to provide a connection between a network device in the first anti-bubble and a network device in the second anti-bubble, and wherein each one of the network control point devices is configured to enforce the network security policy of at least one of the anti-bubbles and wherein each network control point enforces source integrity for all of the plurality of anti-bubble partitions that are connected to it.

17. A secure network as defined in claim 16, wherein no data can be transmitted from any network device in the first anti-bubble to any network device in the second anti-bubble.

18. A secure network as defined in claim 16, further comprising a bubble having a distinct network security policy and a plurality of bubble partitions, each bubble partition having a plurality of network devices configured to transmit and receive data.

19. A secure network as defined in claim 18, wherein data transmitted from a network device in the first anti-bubble to a network device in the bubble traverses one or more network control points.

20. A secure network as defined in claim 16, wherein each anti-bubble partition connects to only one network control point.

21. A secure network as defined in claim 16, further comprising an inter-bubble device configured to connect the first anti-bubble to the second anti-bubble and to enforce the network security policy of the first and second anti-bubbles.

22. A secure network as defined in claim 16, wherein each of the plurality of anti-bubble partitions that belong to the same anti-bubble has the same network security policy applied at each of the plurality of network control points that are connected to the plurality of anti-bubble partitions.

23. A secure network as defined in claim 16, wherein each of the plurality of anti-bubble partitions has no network connectivity to any other anti-bubble partitions within the same anti-bubble.

24. A secure network as defined in claim 16, wherein each of the plurality of anti-bubble partitions is connected to at least two network control point devices to achieve high availability in the case of a failed interface or network control point device.

25. A secure network as defined in claim 16, wherein each of the plurality of anti-bubble partitions is defined by an address range.

26. A secure network as defined in claim 25, wherein each of the plurality of network devices in each of the plurality of anti-bubble partitions has an address contained within the address range.

27. A secure network as defined in claim 26, wherein each address exists in only one of the plurality of anti-bubble partitions.

28. A secure network as defined in claim 16, wherein data may not be transmitted between two network control point devices in different anti-bubble partitions of the same anti-bubble.

29. A secure network as defined in claim 16, wherein the plurality of network control points are coupled to one another and form a virtual backbone that is external to the first and the second anti-bubbles.

30. A secure network as defined in claim 29, wherein each of the plurality of network control points ensure source address integrity across the virtual backbone.

31. A secure network as defined in claim 16, further comprising an inter-bubble device configured to connect the first anti-bubble to the second anti-bubble and to enforce the network security policy of the first and second anti-bubbles.

32. A secure network configured to carry data, comprising:
  a plurality of anti-bubbles, each anti-bubble having a plurality of anti-bubble partitions, each anti-bubble partition having at least one network device configured to transmit and receive data, and wherein no data can be transmitted between two devices in different anti-bubble partitions of the same anti-bubble and all of the network devices corresponding to at least one of the plurality of anti-bubbles having the same network security policy; and
  a plurality of network control points, each network control point including one or more network control point devices having at least one interface, wherein each anti-bubble partition is connected to only one network control point, which is used to provide a connection between any two network devices of different anti-bubbles, and wherein each one of the network control point devices is configured to enforce the network security policy of the anti-bubble that the network control point device is connected to and wherein when data is transmitted from one network device to another network device, two network control points are traversed.

33. A secure network as defined in claim 32, further comprising a plurality of inter-bubble devices, each inter-anti-bubble device is configured to connect at least two of the plurality of anti-bubbles to one another and to enforce the network security policy of each of the plurality of anti-bubbles that it is connected to.

34. A secure network as defined in claim 32, wherein each of the plurality of anti-bubble partitions has no network connectivity to any other anti-bubble partitions belonging to the same anti-bubble.

35. A secure network as defined in claim 32, wherein each of the plurality of anti-bubble partitions that belong to the same bubble has the same network security policy applied at each of the plurality of network control points that are connected to the plurality of anti-bubble partitions.

36. A secure network as defined in claim 32, wherein the plurality of network control points are coupled to one another and form a virtual backbone that is external to all of the plurality of anti-bubbles.

37. A secure network as defined in claim 36, wherein each of the plurality of network control points ensure source address integrity across the virtual backbone.

38. A secure network as defined in claim 32, wherein each network device connects to only one network control point.

39. A secure network as defined in claim 32, wherein each of the plurality of anti-bubble partitions is defined by an address range.

40. A secure network as defined in claim 32, wherein each of the network devices in each of the plurality of anti-bubble partitions has an address contained within the address range.

41. A secure network as defined in claim 40, wherein each address exists in only one of the plurality of anti-bubble partitions.

42. A secure network as defined in claim 32, wherein data may not be transmitted between two network devices in different anti-bubble partitions of the same anti-bubble.

43. A secure network as defined in claim 32, wherein each of the plurality of network control points ensures source address integrity at the connection between any two network devices of the plurality of anti-bubbles.

44. A secure network as defined in claim 32, wherein each of the plurality of anti-bubble partitions is connected to at least two network control point devices to achieve high availability in the case of a failed interface or network control point device.

45. A secure network configured to carry data, comprising:
  a plurality of anti-bubbles, each anti-bubble having a plurality of anti-bubble partitions, each anti-bubble partition having at least one network device configured to transmit and receive data, and all of the network devices corresponding to at least one of the plurality of anti-bubbles have the same network security policy;
  a plurality of bubbles, each bubble having a plurality of bubble partitions, each bubble partition having at least one network device configured to transmit and receive data, and all of the network devices corresponding to at least one of the plurality of bubbles have the same network security policy; and a plurality of network control points, each network control point including one or more network control point devices having at least one interface, wherein each anti-bubble partition and each bubble partition is connected to one of the plurality of network control points, which are used to provide a connection between two or more network devices of different anti-bubbles and two or more network devices of the plurality of bubbles, and wherein the plurality of network control points are coupled to one another and form a virtual backbone that is external to all of the plurality of anti-bubbles and bubbles and wherein each one of the network control point devices is configured to enforce the network security policy of the anti-bubble and bubble that the network control point device is connected to.

46. A secure network as defined in claim 45, wherein no data can be transmitted between two devices in different anti-bubble partitions.

47. A secure network as defined in claim 45, wherein data can be transmitted from a network device in any of the plurality of anti-bubbles to a network device in any of the plurality of bubbles via the plurality of network control points.

48. A secure network as defined in claim 45, wherein all data transmitted between one device in one of the plurality of anti-bubble partitions and one device in one of the plurality of bubble partitions traverse one or more network control points.

49. A secure network as defined in claim 45, wherein each of the plurality of network control points ensure source address integrity across the virtual backbone.

50. A secure network as defined in claim 45, wherein each of the plurality of anti-bubble partitions and bubble partitions is defined by an address range.

51. A secure network as defined in claim 50, wherein each of the network devices in each of the plurality of anti-bubble partitions and each of the plurality of bubble partitions has an address contained within the address range.

52. A secure network as defined in claim 51, wherein each address exists in only one of the plurality of anti-bubble partitions or only one of the plurality of bubble partitions.

* * * * *